United States Patent
Mallick et al.

(10) Patent No.: US 11,816,139 B2
(45) Date of Patent: Nov. 14, 2023

(54) BLOCK-LEVEL CLASSIFICATION OF UNSTRUCTURED DATA

(71) Applicant: EMC IP Holding Company LLC, Hopkinton, MA (US)

(72) Inventors: Sanjib Mallick, Bangalore (IN); Kundan Kumar, Bangalore (IN); Sumana Ramachandra, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/077,836

(22) Filed: Oct. 22, 2020

(65) Prior Publication Data
US 2022/0129494 A1 Apr. 28, 2022

(51) Int. Cl.
G06F 16/172 (2019.01)
G06F 16/13 (2019.01)
G06F 16/35 (2019.01)

(52) U.S. Cl.
CPC ............ *G06F 16/355* (2019.01); *G06F 16/13* (2019.01); *G06F 16/172* (2019.01)

(58) Field of Classification Search
CPC ....... G06F 16/355; G06F 16/13; G06F 16/172
USPC ...................................................... 707/740
See application file for complete search history.

(56) References Cited

U.S. PATENT DOCUMENTS

| | | | |
|---|---|---|---|
| 7,383,389 B1 * | 6/2008 | Bumbulis | G06F 12/0842 |
| | | | 711/E12.039 |
| 9,098,466 B2 * | 8/2015 | Barnes | G06F 11/20 |
| 9,201,803 B1 | 12/2015 | Derbeko et al. | |
| 9,430,368 B1 | 8/2016 | Derbeko et al. | |
| 9,672,160 B1 | 6/2017 | Derbeko et al. | |
| 9,696,917 B1 * | 7/2017 | Sareena | G06F 3/0689 |
| 9,778,852 B1 * | 10/2017 | Marshak | G06F 3/0647 |
| 9,880,933 B1 * | 1/2018 | Gupta | G06F 12/0815 |
| 10,366,014 B1 * | 7/2019 | Ruef | G06F 3/065 |

(Continued)

OTHER PUBLICATIONS

Skopal et al., D-Cache: Universal Distance Cache for Metric Access Methods, 2012, IEEE, vol. 24, No. 5, May 2012, all pages. (Year: 2012).*

(Continued)

*Primary Examiner* — Mark E Hershley
*Assistant Examiner* — Antonio J Caiado
(74) *Attorney, Agent, or Firm* — Ryan, Mason & Lewis, LLP

(57) ABSTRACT

Methods, apparatus, and processor-readable storage media for block-level classification of unstructured data are provided herein. An example apparatus includes a host device comprising a processor coupled to memory, the host device being configured to communicate over a network with a storage system, and further being configured to: obtain a pointer to a page cache associated with an input-output operation for at least one page of unstructured data of a file; obtain an index node object of the file based at least in part on the pointer to the page cache; derive at least one characteristic of the file based at least in part on the obtained index node object; and provide an indication of the at least one characteristic to the storage system. The storage system determines whether to apply one or more functions to the unstructured data based on the indication.

20 Claims, 4 Drawing Sheets

(56) References Cited

U.S. PATENT DOCUMENTS

| | | | |
|---|---|---|---|
| 10,439,878 B1* | 10/2019 | Tah | H04L 69/14 |
| 10,474,367 B1 | 11/2019 | Mallick et al. | |
| 10,740,245 B2* | 8/2020 | Jia | G06F 12/0868 |
| 2005/0216672 A1* | 9/2005 | Gschwind | G06F 12/0862 |
| | | | 711/E12.027 |
| 2013/0318051 A1* | 11/2013 | Kumar | G06F 16/137 |
| | | | 707/692 |
| 2016/0110249 A1* | 4/2016 | Orme | G06F 11/1016 |
| | | | 714/6.24 |
| 2016/0117113 A1* | 4/2016 | Li | G06F 3/0629 |
| | | | 711/112 |
| 2017/0004045 A1* | 1/2017 | Abhijeet | H04L 9/0894 |
| 2018/0285198 A1* | 10/2018 | Dantkale | G06F 12/128 |
| 2018/0300207 A1* | 10/2018 | Zhang | G06F 11/1469 |
| 2019/0179805 A1* | 6/2019 | Prahlad | H04L 67/1097 |

OTHER PUBLICATIONS

K. Piepho, "Dell EMC SC Series Storage: Microsoft Multipath I/O," Dell EMC Engineering, Jun. 2017.
NVMe Specification, Revision 1.3, May 2017.
Kessler, Gary, GCK's File Signatures Table, Sep. 20, 2020, available at https://www.garykessler.net/library/file_sigs.html, last accessed Oct. 22, 2020.

* cited by examiner

BLOCK-LEVEL CLASSIFICATION OF UNSTRUCTURED DATA

FIELD

The field relates generally to information processing systems, and more particularly to storage in such systems.

BACKGROUND

Host devices typically communicate with a storage system over a network via a number of different paths. A given host device may comprise a multipath input-output (MPIO) driver that is configured to process input-output (TO) operations for delivery from the host device to the storage system over the paths. The storage system can perform various data services (e.g., compression, deduplication, and encryption) on the data corresponding to such IO operations. For unstructured files, the storage system generally does not have the information necessary to determine which, if any, of these data services to perform.

SUMMARY

Illustrative embodiments of the disclosure provide techniques for classifying unstructured data. In one embodiment, an apparatus comprises a host device comprising a processor coupled to memory, the host device being configured to communicate over a network with a storage system. The host device is configured to: obtain a pointer to a page cache associated with an IO operation for at least one page of unstructured data of a file; obtain an index node object of the file based at least in part on the pointer to the page cache; derive at least one characteristic of the file based at least in part on the obtained index node object; and provide an indication of the at least one characteristic to the storage system. The storage system determines whether to apply at least one function to the unstructured data based at least in part on the indication.

Illustrative embodiments can provide significant advantages relative to conventional approaches. For example, problems associated with storage systems applying unnecessary data services are overcome in one or more embodiments through classifying unstructured data by a host device at the block level and intelligently applying data services to the unstructured data based on the classification.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
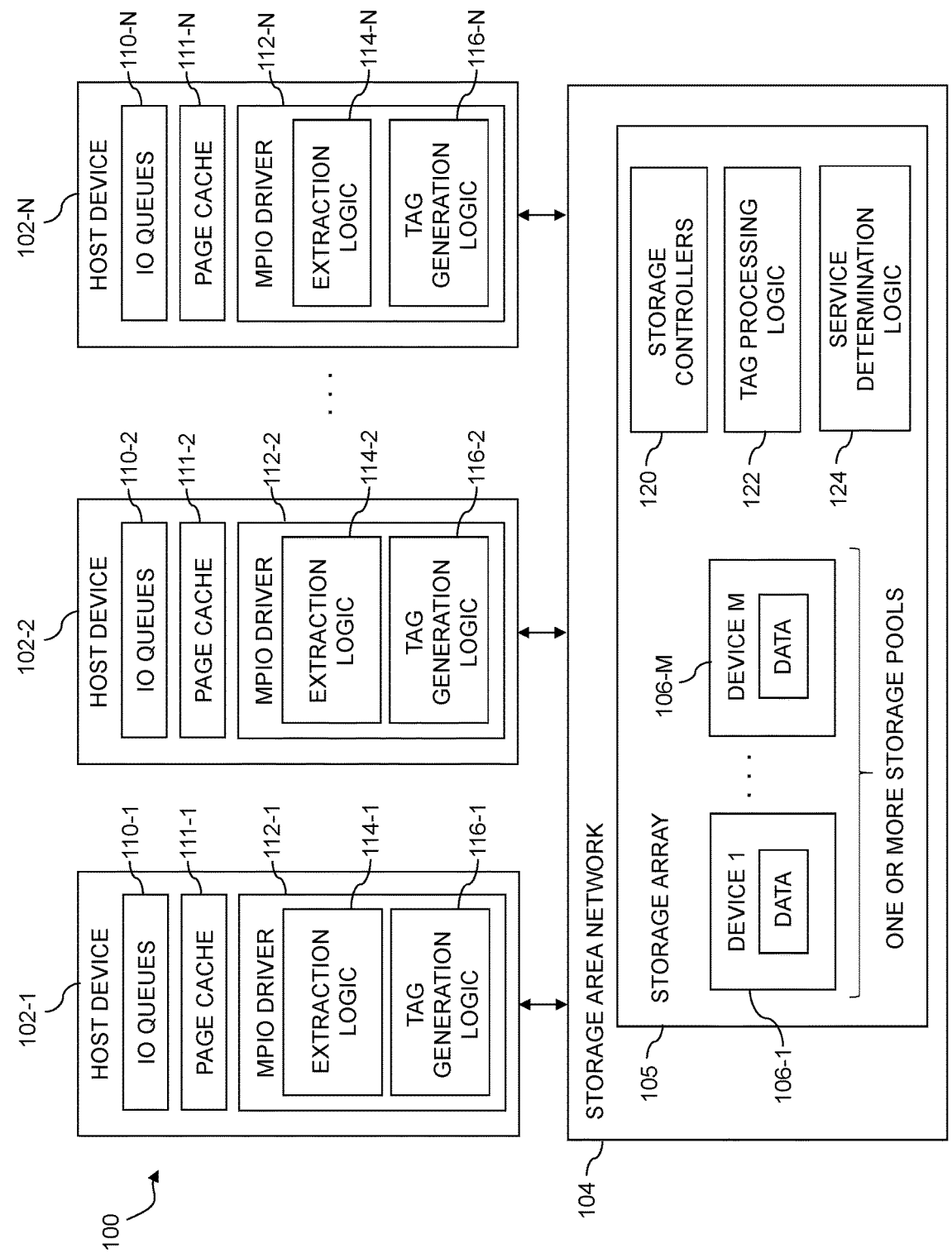
FIG. 1 is a block diagram of an information processing system configured with functionality for block-level classification of unstructured data in an illustrative embodiment.

FIG. 1 shows an information processing system 100 configured in accordance with an illustrative embodiment. The information processing system 100 comprises a plurality of host devices 102-1, 102-2, . . . 102-N (collectively referred to herein as host devices 102). The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools.

The storage array 105 and its associated storage devices 106 are an example of what is more generally referred to herein as a "storage system." This storage system in the present embodiment is shared by the host devices 102 and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 over the SAN 104. For example, at least a subset of the host devices 102 may be implemented as respective virtual machines (VMs) of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands of a SCSI access protocol and/or NVM Express (NVMe) commands of an NVMe access protocol, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (IB), Gigabit Ethernet or Fibre Channel (FC). Numerous alternative networking arrangements are possible in a given embodiment, as will be appreciated by those skilled in the art.

The host devices 102 comprise respective sets of IO queues 110-1, 110-2 . . . 110-N, respective page caches 111-1, 111-2, . . . 111-N, and respective MPIO drivers 112-1, 112-2, . . . 112-N (collectively referred to herein as IO queues 110, page caches 111, and MPIO drivers 112, respectively).

The MPIO drivers 112 comprise a multi-path layer of the host devices 102. Path selection functionality for delivery of IO operations from the host devices 102 to the storage array 105 is provided in the multi-path layer by respective instances of path selection logic (not explicitly shown in FIG. 1) implemented within the MPIO drivers 112. The multi-path layer further provides functionality for block-level classification of unstructured data. Such functionality is provided at least in part using respective instances of extraction logic 114-1, 114-2, . . . 114-N and tag generation logic 116-1, 116-2, . . . 116-N implemented within the respective MPIO drivers 112.

The MPIO drivers 112 may comprise, for example, otherwise conventional MPIO drivers, such as PowerPath® drivers from Dell EMC, suitably modified in the manner disclosed herein to provide functionality for block-level classification of unstructured data. Other types of MPIO drivers from other driver vendors may be suitably modified to incorporate functionality for block-level classification of unstructured data as disclosed herein.

The page caches 111 are generally used to buffer IO operations. For example, for a given IO operation, the page cache 111-1 copies one or more pages of the file corresponding to the IO operation to the page cache. A "page" as used herein generally refers to a basic unit of memory having a fixed size defined by the operating system. The data in the page cache 111-1 are then periodically written to the underlying storage device(s) such as those corresponding to storage array 105, for example.

The host devices 102 can include additional or alternative components. For example, in some embodiments, the host devices 102 comprise respective local caches in addition to the page caches 111, implemented using respective memories of those host devices. A given such local cache can be implemented using one or more cache cards, possibly implementing caching techniques such as those disclosed in U.S. Pat. Nos. 9,201,803, 9,430,368 and 9,672,160, each entitled "System and Method for Caching Data," and incorporated by reference herein. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 4.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

In the FIG. 1 embodiment, the storage array 105 comprises a plurality of storage controllers 120, tag processing logic 122 and service determination logic 124. The tag processing logic 122 processes one or more tags (or indications) generated by respective ones of the tag generation logic 116 of the host devices 102 indicative of characteristics of the unstructured data. The service determination logic 124 determines whether one or more data services should be applied by the storage array 105 to the unstructured data based on the characteristics.

Communications between the host devices 102 and the storage array can utilize an in-band communication mechanism in which one or more predetermined commands in a designated storage protocol are sent from the host device 102-1 to the storage array 105. Such predetermined commands can comprise, for example, a log sense command, a mode sense command, a "vendor unique command" or VU command, or combinations of multiple instances of these or other commands, in an otherwise standardized command format, such as a SCSI format or other type of format.

The above-noted command in some embodiments comprises at least one predetermined vendor unique or VU command of a storage access protocol which the host device 102-1 utilizes to communicate with the storage array 105, such as a SCSI or NVMe protocol. A wide variety of different arrangements of commands may be used, as well as numerous associated timing techniques for repeatedly sending such commands from the host device 102-1 to the storage array 105. A "command" as the term is broadly used herein can comprise a combination of multiple distinct commands, such as respective different commands for different ones of a plurality of initiators.

Additional components not explicitly shown in the figure, such as one or more storage caches, may also be provided in the storage array 105 for use in processing IO operations. For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of IO operations.

In conventional approaches, storage arrays are not aware of characteristics of data blocks corresponding to IO operations from host devices. Such characteristics may include, for example, the originator of the data blocks, or whether the data blocks are compressed or encrypted. Without this knowledge, a storage array may perform unnecessary computations relating to data services. For instance, a data compression service does not need to be used on data that are already compressed, and deduplication and compression data services cannot be used on data that are already encrypted. Some conventional approaches implement an IO tagging framework, wherein the MPIO driver of a host device learns the process name or thread name of application processes and tags the corresponding data with this information. However, such frameworks are not useful in situations when a file system is created on a volume and applications utilize unstructured files (such as, for example, image files, video files, document files, music files, etc.) as there is no way for the storage system to determine the characteristics of such files.

Illustrative embodiments overcome these and other drawbacks of conventional practice by leveraging the use of MPIO drivers 112 in host devices 102, which have access to all of the data corresponding to IO operations at the block layer. In operation, the page cache 111-1 is populated for a given IO operation associated with a file having unstructured data. As a result, the page cache 111-1 includes pages of the unstructured data and a page field which comprises an address of an index node object (commonly referred to as an inode) to which the unstructured data included in the page belongs. Generally, the inode object includes the information that is necessary for the file system to handle a file. It is noted that an inode object is unique to the file and remains the same as long as the file exists even if the filename is changed.

In some example embodiments, the host device 102-1 may include a logical volume manager (LVM) that maps the blocks of the unstructured data corresponding to the IO operation using a logical block addressing (LBA) process.

Additionally, the host device 102-1 populates a block IO structure (BIO). Generally, a given BIO is a descriptor of the ongoing IO block device operation. Each BIO includes an identifier for a disk storage area (for example, an initial sector number and the number of sectors included in the storage area) and one or more segments describing the memory areas involved in the IO operation. The BIO includes a pointer to the array of segments, which is commonly referred to as a bio_vec array. The segments in the array represent the actual payload of the IO operation. The BIO also includes a field that indicates the address of the page cache 111-1.

Once the BIO is populated, a queue request function is invoked to insert the BIO corresponding to the IO operation in the request queue associated with the storage array 105.

The MPIO driver 112-1 intercepts the queue request function to retrieve the BIO. In some examples, the MPIO driver 112-1 extracts file information by obtaining the pointer of the page cache 111-1 from the BIO, including a file header. As noted above, the page cache 111-1 includes an address of the corresponding inode object of the file. The MPIO driver 112-1 uses this address to obtain the inode object. The MPIO driver may then update the inode object based on the file header from the BIO, for example. The MPIO driver 112-1 may determine the file type of the unstructured data at the block level by comparing the file header extracted from the BIO to a set of fixed file headers corresponding to different file types (for example, the set may include a first file header that corresponds to an MP4 file, a second file header that corresponds to JPG files, etc.). In at least one example embodiment, for one or more subsequent BIOS, the file type may be determined using the updated inode object.

The host device 102-1 then tags the IO operation to indicate the extracted information. As a non-limiting example, in at least one embodiment a tag is inserted into a CDB of the IO operation, such as within a group field of the CDB, for example. The MPIO driver 112-1 sends the tagged IO to the storage array 105. In some example embodiments, data are tagged to indicate the actual file type (e.g., a first tag can be used to indicate a JPEG file type, a second tag can be used to indicate a MP4 file type, etc.) and/or tagged to indicate the characteristics of the file type (e.g., a tag used to indicate that the data are compressed).

The storage array 105 processes the tags inserted by the MPIO driver 112-1 using its tag processing logic 122. As an example, the storage array 105 may identify any tags added by the MPIO driver 112-1, and determine characteristics corresponding to such tags. For instance, the storage array may identify a tag that indicates the data correspond to a JPEG file, and thus are compressed. The service determination logic 124 of storage array 105 intelligently allows or prevents data services from being applied based on the tags. For the above JPEG file example, the service determination logic 124 may prevent a compression data service from being applied since the data in the JPEG file are already compressed. If the data are determined to be encrypted, then the service determination logic 124 prevents deduplication and compression data services from being applied.

Additionally, in some example embodiments, the MPIO driver 112-1 may update the inode object with the determined file type. Accordingly, subsequent IO operations corresponding to the file can be tagged using the file type in the inode object.

Additionally, or alternatively, a file type may be determined by fetching a filename from the inode object and extracting the filename extension. As a non-limiting example, if the filename is determined to be "pic.jpeg," then the MPIO driver 112-1 can extract the filename extension "jpeg" to determine that the file corresponds to a JPEG file. The IO is then tagged in a similar manner as described above.

At least one example embodiment can determine that an IO operation originates at a file system if the pointer to the inode object is not NULL. The payload data corresponding to the IO operation is then analyzed to extract the file type based on the fact that the inode object is unique for a file in the file system. Additionally, or alternatively, file system information may be derived based on a pointer in the inode object that points to a superblock. The file system information includes, for example, a type of the file system (e.g., ext3, ext4, etc.). The MPIO driver 112-1 may then provide the extracted file system information to the storage array 105 using, for example, a mount status mechanism. Once created, a file system name remains the same over a period of time. Thus, according to one example embodiment, the mount status may be reported periodically (e.g., once a day). As an example, the MPIO driver 112-1 may include a feature to indicate which application is mounted to the volume. This mechanism may be used to indicate to the storage array 105 which file system the volume is mounted with. As such, the MPIO driver 112-1 may indicate to the storage array 105 that, for example, this LUN is mounted to a particular file system, such as, ESX4 or XFS, for example.

An example of a process including such operations will be described below in conjunction with the flow diagrams of FIGS. 2-3. These and other operations referred to herein as being performed by a storage array operating in conjunction with a host device can in other embodiments involve additional or alternative system components, such as one or more additional or alternative external servers not explicitly shown in system 100 of FIG. 1.

These and other functions related to anomaly detection and remediation that are referred to herein as being performed by or under the control of the storage array 105 and MPIO drivers 112 can in some embodiments be performed at least in part outside of the storage array 105 and MPIO drivers 112.

The above-described functions associated with block-level classification of unstructured data in the MPIO driver 112-1 in some embodiments are carried out at least in part under the control of its extraction logic 114-1, illustratively operating in cooperation with tag generation logic 116-1. For example, the extraction logic 114-1 and the tag generation logic 116-1 are illustratively configured to control performance of an algorithm comprising the steps of the process in the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for classification of unstructured data.

Accordingly, functionality described above in the context of the first MPIO driver 112-1 and the first host device 102-1 is assumed to be similarly performed by each of the other MPIO drivers 112 and/or more generally by their respective host devices 102.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support block level classification of unstructured data.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues, as disclosed in U.S. Pat. No. 10,474,367, entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more VMs or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only and should not be construed as limiting in any way. Accordingly, different numbers, types and arrangements of system components such as host devices 102, SAN 104, storage array 105, storage devices 106, sets of IO queues 110, and MPIO drivers 112, including their corresponding instances of extraction logic 114 and tag generation logic 116, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 202 through 208 and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Figure 2:
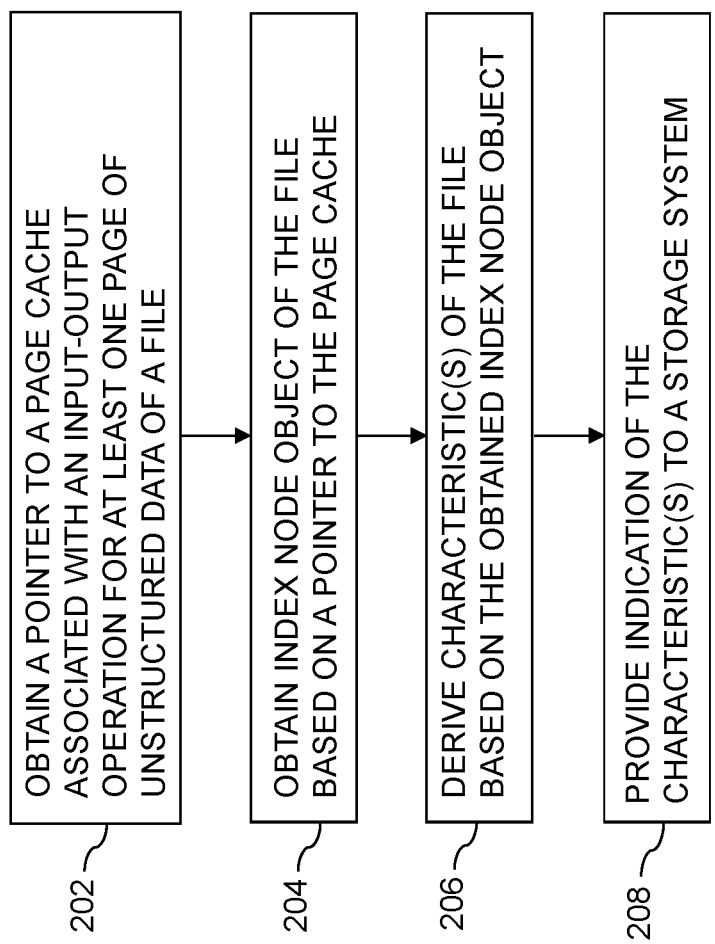
FIG. 2 is a flow diagram of a process for block-level classification of unstructured data in an illustrative embodiment.

The steps of the FIG. 2 process are illustratively performed at least in part by or under the control of an MPIO driver 112 of a given host device utilizing its modules 114 and 116. Other arrangements of system components can be configured to perform at least portions of one or more of the steps in other embodiments.

Step 202 includes obtaining a pointer to a page cache associated with an input-output operation for at least one page of unstructured data of a file. Step 202 may further include obtaining a block request packet (e.g., a BIO) comprising the pointer to the page cache by intercepting a queue request corresponding to the input-output operation at a block layer.

Step 204 includes obtaining the index node object of the file based at least in part on the pointer to the page cache. The page cache may include a pointer to the index node object, and the index node object of the file may be retrieved based on this pointer in the page cache.

Step 206 includes deriving at least one characteristic of the file based at least in part on the pointer to the index node object of the file.

Step 208 includes providing an indication of the at least one characteristic to the storage system. The storage system then determines whether to apply at least one function to the unstructured data based on the indication. The at least one function may include a data service corresponding to at least one of: a deduplication function; an encryption function; and a compression function.

The at least one characteristic may include a file type. The index node object may include a file header offset value, and the file type may be derived by extracting a file header from the unstructured data based on the file header offset value and comparing the extracted file header to a set of file headers defined for a plurality of file types.

The host device may be further configured to update the index node object of the file with the derived file type. The file type may be derived based on a filename extension indicated in the index node object of the file. Step 208 may include inserting the indication of the file type into a CDB.

The at least one characteristic may include a type of a file system. Step 208 may further include using a file system mount status mechanism to indicate the type of the file system to the storage system. The index node object may include a pointer to a superblock, and step 208 may further include deriving a file system type based on the superblock. In at least one example embodiment, the host device is configured to communicate over the network with the storage system via a plurality of paths.

Figure 3:
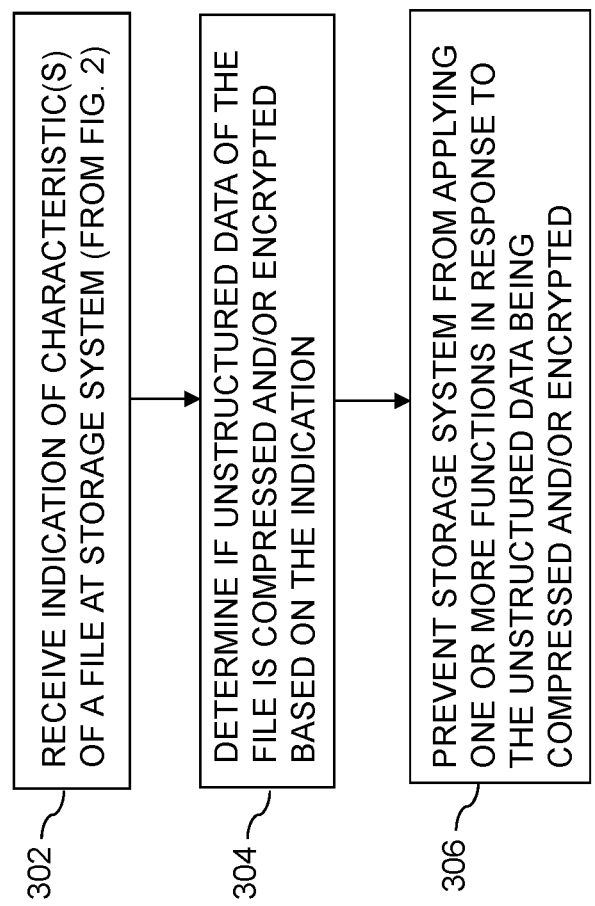
FIG. 3 is a flow diagram of a process for determining data services to be applied to unstructured data in an illustrative embodiment.

Referring now to FIG. 3, this figure shows a flow diagram for determining data services to be applied to unstructured data based on the indications provided by the host device in the process shown in FIG. 2, in an illustrative embodiment. The steps of the FIG. 3 process are illustratively performed at least in part by or under the control of the storage array 105 utilizing its modules 122 and 124. Other arrangements of system components can be configured to perform at least portions of one or more of the steps in other embodiments.

Step 302 includes receiving the indication of at least one characteristic of the file from step 208 of FIG. 2.

Step 304 includes determining if unstructured data of the file is compressed and/or encrypted based on the indication.

Step 306 includes preventing the storage system from applying one or more data services in response to the unstructured data being compressed and/or encrypted. For example, if the data are compressed, then the storage system may prevent a compression data service from being applied. Additionally, if the data are encrypted then the storage system may prevent one or more of a deduplication data service and a compression data service from being applied.

The particular processing operations and other system functionality described in conjunction with each of the flow diagrams of FIGS. 2 and 3 are presented by way of illustrative example only and should not be construed as limiting the scope of the disclosure in any way. Alternative embodiments can use other types of processing operations involving host devices, storage systems and functionality for classification of unstructured data. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different anomaly detection and remediation arrangements within a given information processing system.

The functionality such as that described in conjunction with each of the flow diagrams of FIGS. 2 and 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 4:
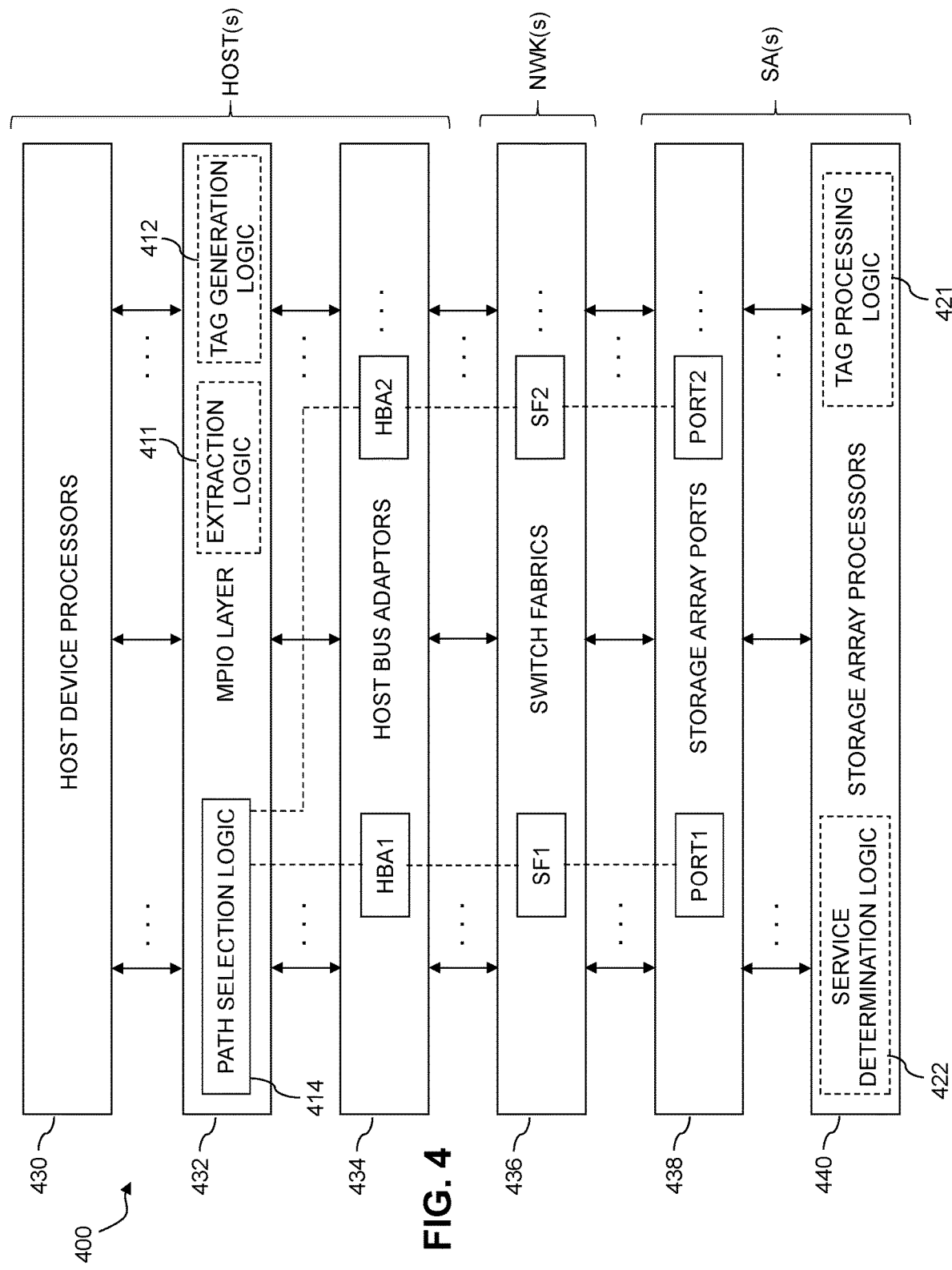
FIG. 4 is a block diagram showing multiple layers of a layered system architecture that includes a multi-path layer with functionality for classifying unstructured data in an illustrative embodiment.

Referring now to FIG. 4, another illustrative embodiment is shown. In this embodiment, an information processing system 400 comprises host-side elements that include extraction logic 411, tag generation logic 412, and path selection logic 414 and storage-side elements that include tag processing logic 421 and service determination logic 422. There may be separate instances of one or more such elements associated with each of a plurality of system components such as host devices and storage arrays of the system 400.

The system 400 is configured in accordance with a layered system architecture that illustratively includes a host device processor layer 430, an MPIO layer 432, an HBA layer 434, a switch fabric layer 436, a storage array port layer 438 and a storage array processor layer 440. The host device processor layer 430, the MPIO layer 432 and the HBA layer 434 are associated with one or more host devices, the switch fabric layer 436 is associated with one or more SANs or other types of networks, and the storage array port layer 438 and storage array processor layer 440 are associated with one or more storage arrays ("SAs").

In an example embodiment, application processes corresponding to one or more host devices generate IO operations that are processed by the MPIO layer 432 for delivery to the one or more storage arrays. Paths are determined by the path selection logic 414 for sending such IO operations to the one or more storage arrays. The MPIO layer 432 is an example of what is also referred to herein as a multi-path layer and comprises one or more MPIO drivers implemented in respective host devices. Each such MPIO driver illustratively comprises respective instances of extraction logic 411, tag generation logic 412, and path selection logic 414 configured as previously described. Additional or alternative layers and logic arrangements can be used in other embodiments.

The system 400 in this embodiment implements classification of unstructured data utilizing the tag processing logic 421, and service determination logic 422, as well as one or more MPIO drivers of the MPIO layer 432, and their associated instances of extraction logic 411 and tag generation logic 412. In a manner similar to that described elsewhere herein, extraction logic 411 is configured to extract one or more characteristics corresponding to a given IO operation involving unstructured data. The extracted characteristics are utilized by the tag generation logic 412, which generated indications of the extracted characteristics. The indications are delivered to and processed by the tag processing logic 421 on the storage side of the system 400. The service determination logic 422 decides which data services (or functions) are to be applied based on the processing. A wide variety of other distributed logic arrangements are possible, and the extraction logic 411, tag generation logic 412, tag processing logic 421, and service determination logic 422 are therefore shown in dashed outline in the figure. For example, the extraction logic 411 and/or tag generation logic 412 may be implemented at least in part within the host device processor layer 430.

In the system 400, path selection logic 414 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 4 embodiment can illustratively have a set of n paths to a shared storage array, or alternatively different ones of the host devices can have different numbers and types of paths to the storage array.

The path selection logic 414 of the MPIO layer 432 in this embodiment selects paths for delivery of IO operations to the one or more storage arrays having the storage array ports of the storage array port layer 438. More particularly, the path selection logic 414 determines appropriate paths over which to send particular IO operations to particular logical storage devices of the one or more storage arrays.

It is assumed in this embodiment that the host devices through their respective MPIO drivers and respective instances of extraction logic 411, tag generation logic 412, provide functionality for classification of unstructured data, illustratively with involvement of other host device components such as the path selection logic 414.

Some implementations of the system 400 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 400 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

The above-described processes, algorithms and other features and functionality disclosed herein are presented by way of illustrative example only, and other embodiments can utilize additional or alternative arrangements.

Also, as mentioned previously, different instances of the above-described processes, algorithms and other techniques for classification of unstructured data can be performed using different system components. For example, the extraction logic 411 and/or the tag generation logic 412 can be implemented using other types of host drivers, such as, for example, iSCSI drivers, or more generally other host device components.

The particular unstructured data classification arrangements described above are therefore presented by way of illustrative example only. Numerous alternative arrangements of these and other features can be used in implementing the anomaly detection and remediation in other illustrative embodiments.

The above-described illustrative embodiments provide significant advantages relative to conventional approaches. For example, some embodiments are configured to classify unstructured data at a block level. These and other embodiments can effectively overcome problems with applying unnecessary data services, thus improving system performance by reducing unnecessary operations.

Also, some embodiments also enable advanced data analytics based on the classification of the unstructured data.

Functionality for classification of unstructured data as disclosed herein can be implemented in a storage system, in a host device, or partially in a storage system and partially in a host device, and additionally or alternatively using other arrangements of one or more processing devices each comprising at least a processor and a memory coupled to the processor.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including VMs implemented using a hypervisor that runs on physical infrastructure. The cloud infrastructure further comprises sets of applications running on respective ones of the VMs under the control of the hypervisor. It is also possible to use multiple hypervisors each providing a set of VMs using at least one underlying physical machine. Different sets of VMs provided by one or more hypervisors may be utilized in configuring multiple instances of various components of the system.

These and other types of cloud infrastructure can be used to provide what is also referred to herein as a multi-tenant environment. One or more system components such as VMs, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. VMs provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on VMs in a multi-tenant environment, although other arrangements are possible. The containers may be utilized to implement a variety of different types of functionalities within the system 100. For example, containers can be used to implement respective compute nodes or storage nodes of a cloud-based system. Again, containers may be used in combination with other virtualization infrastructure such as VMs implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of extraction logic 114 and tag generation logic 116 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, extraction logic, tag generation logic, tag processing logic, service determination logic, and additional or alternative components. Also, the particular configurations of system and device elements and associated processing operations illustratively shown in the drawings can be varied in other embodiments. For example, a wide variety of different host device configurations and associated anomaly detection and remediation arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device comprising a processor coupled to a memory, the host device being configured to communicate over a network with a storage system, the host device being configured:
to obtain, by an input-output driver of the host device, a pointer to a page cache of the host device, wherein the pointer is:
(i) associated with an input-output operation for at least one page of unstructured data of a file, and
(ii) obtained at least in part by intercepting a queue request corresponding to the input-output operation at a block layer;
to obtain an index node object of the file based at least in part on the pointer to the page cache;
to derive at least one characteristic of the file based at least in part on the obtained index node object of the file, wherein the at least one characteristic comprises a file type;
to insert, using the input-output driver of the host device, an indication of the at least one characteristic into the input-output operation;
to provide the input-output operation to the storage system, wherein the storage system determines, based at least in part on the indication, at least one of:
(i) to apply at least one function to the unstructured data of the file; and
(ii) to prevent at least one function from being applied to the unstructured data of the file;
to update the index node object of the file with the derived file type; and
to insert an indication of the derived file type into one or more subsequent input-output operations using the updated index node object of the file.

2. The apparatus of claim 1, wherein the page cache comprises a pointer to the index node object of the file, and wherein the index node object of the file is obtained based at least in part on the pointer to the index node object of the file.

3. The apparatus of claim 1,
wherein the index node object of the file comprises a file header offset value; and
wherein the file type is derived by extracting a file header from the unstructured data of the file based on the file header offset value and comparing the extracted file header to a set of file headers defined for a plurality of file types.

4. The apparatus of claim 1, wherein the file type is derived based on a filename extension indicated in the index node object of the file.

5. The apparatus of claim 1, wherein the indication of the derived file type is inserted into a command descriptor block.

6. The apparatus of claim 1, wherein the at least one characteristic comprises a type of a file system, and wherein the providing comprises using a file system mount status mechanism to indicate the type of the file system to the storage system.

7. The apparatus of claim 6, wherein the index node object of the file comprises a pointer to a superblock, and wherein the type of the file system is derived based on the superblock.

8. The apparatus of claim 1, wherein the at least one function comprises at least one of:
a deduplication function;
an encryption function; and
a compression function.

9. The apparatus of claim 1, wherein obtaining the pointer to the page cache comprises:
using the intercepted queue request to obtain a block request packet comprising the pointer to the page cache.

10. A method performed by a host device configured to communicate over a network with a storage system, comprising:
obtaining, by an input-output driver of the host device, a pointer to a page cache of the host device, wherein the pointer is:
(i) associated with an input-output operation for at least one page of unstructured data of a file, and
(ii) obtained at least in part by intercepting a queue request corresponding to the input-output operation at a block layer;
obtaining an index node object of the file based at least in part on the pointer to the page cache;
deriving at least one characteristic of the file based at least in part on the obtained index node object of the file, wherein the at least one characteristic comprises a file type;
inserting, using the input-output driver of the host device, an indication of the at least one characteristic into the input-output operation;

providing the input-output operation to the storage system, wherein the storage system determines, based at least in part on the indication, at least one of:
(i) to apply at least one function to the unstructured data of the file; and
(ii) to prevent at least one function from being applied to the unstructured data of the file;
updating the index node object of the file with the derived file type; and
inserting an indication of the derived file type into one or more subsequent input-output operations using the updated index node object of the file;
wherein the host device comprises a processor coupled to a memory.

11. The method of claim 10, wherein the page cache comprises a pointer to the index node object of the file, and wherein the index node object of the file is obtained based at least in part on the pointer to the index node object of the file.

12. The method of claim 10,
wherein the index node object of the file comprises a file header offset value; and
wherein the file type is derived by extracting a file header from the unstructured data of the file based on the file header offset value and comparing the extracted file header to a set of file headers defined for a plurality of file types.

13. A computer program product comprising a non-transitory processor-readable storage medium having stored therein program code of one or more software programs, wherein the program code, when executed by a host device configured to communicate over a network with a storage system, causes the host device:
to obtain, by an input-output driver of the host device, a pointer to a page cache of the host device, wherein the pointer is: (i) associated with an input-output operation for at least one page of unstructured data of a file, and (ii) obtained at least in part by intercepting a queue request corresponding to the input-output operation at a block layer;
to obtain an index node object of the file based at least in part on the pointer to the page cache;
to derive at least one characteristic of the file based at least in part on the obtained index node object of the file, wherein the at least one characteristic comprises a file type;
to insert, using the input-output driver of the host device, an indication of the at least one characteristic into the input-output operation;
to provide the input-output operation to the storage system, wherein the storage system determines, based at least in part on the indication, at least one of: (i) to apply at least one function to the unstructured data of the file; and (ii) to prevent at least one function from being applied to the unstructured data of the file;
to update the index node object of the file with the derived file type; and
to insert an indication of the derived file type into one or more subsequent input-output operations using the updated index node object of the file.

14. The computer program product of claim 13, wherein the page cache comprises a pointer to the index node object of the file, and wherein the index node object of the file is obtained based at least in part on the pointer to the index node object of the file.

15. The computer program product of claim 13,
wherein the index node object of the file comprises a file header offset value; and
wherein the file type is derived by extracting a file header from the unstructured data of the file based on the file header offset value and comparing the extracted file header to a set of file headers defined for a plurality of file types.

16. The computer program product of claim 13, wherein obtaining the pointer to the page cache comprises:
using the intercepted queue request to obtain a block request packet comprising the pointer to the page cache.

17. The method of claim 10, wherein the derived file type is derived based on a filename extension indicated in the index node object of the file.

18. The method of claim 10, wherein the indication of the derived file type is inserted into a command descriptor block.

19. The method of claim 10, wherein the at least one characteristic comprises a type of a file system, and wherein the providing comprises using a file system mount status mechanism to indicate the type of the file system to the storage system.

20. The method of claim 19, wherein the index node object of the file comprises a pointer to a superblock, and wherein the type of the file system is derived based on the superblock.

* * * * *